United States Patent

[11] 3,573,442

[72] Inventor Richard E. Andeen
Phoenix, Ariz.
[21] Appl. No. 646,549
[22] Filed June 16, 1967
[45] Patented Apr. 6, 1971
[73] Assignee Sperry Rand Corporation

[54] SAMPLED DATA HYBRID ANALOGUE-DIGITAL COMPUTER SYSTEM
16 Claims, 9 Drawing Figs.

[52] U.S. Cl. ................................................ 235/150.5,
235/150.51, 235/150.52, 235/150.2, 235/151.1
[51] Int. Cl. ..................................................... G06j 1/11
[50] Field of Search .......................................... 235/150.3,
150.31, 150.4, 150.5, 150.51, 150.52, 150.53,
193, 183; 340/172.5

[56] References Cited
UNITED STATES PATENTS

| | | | |
|---|---|---|---|
| 2,966,302 | 12/1960 | Woolf et al. | 235/150.52 |
| 3,311,910 | 3/1967 | Doyle | 235/150.52X |
| 3,314,050 | 4/1967 | Debroux et al. | 235/150.5X |
| 3,330,943 | 7/1967 | Hawkins | 235/150.5 |
| 3,373,273 | 3/1968 | Schubert | 235/150.53X |

Primary Examiner—Eugene G. Botz
Assistant Examiner—Joseph F. Ruggiero
Attorney—Samuel C. Yeaton ABSTRACT: A hybrid analog-digital computer apparatus, particularly applicable in controlling complex servomechanisms such as aircraft flight control actuation and display systems, comprising a time shared or multiplexed operational amplifier adapted to receive analog signals from control system inputs and command sources through a large plurality of solid state switching devices at controllable gain levels and to supply outputs through a plurality of similar output switching devices to a plurality of analog storage devices, such as simple capacitors, the charges on the capacitors being fed back to the amplifier input in predetermined controlled manners for performing various control functions; the computer outputs being the resultant charges on one or more of said capacitors and being supplied to the actuation and/or display devices. Through predetermined control of the input and output switches, one or more input signals are selected and various computational operations thereon are performed as required for proper system control. The signals to be selected and the computations to be performed are under the control of a programmed digital memory, the sequential word and word bit outputs of which determine the sequence and orders respectively of switch operations and the signal gains required. The digital format of the program output and the high-speed operation of the solid-state switches provide extremely rapid sequencing of desired computations while the data always remains in analog form thereby retaining the precise resolution of analog computers while providing the high-speed capability of digital computers. Since all the computations are determined by the programmed memory, the computer is adaptable to control systems of widely different characteristics and complexity merely by the addition or deletion of switches and storage capacitors and by inserting the proper program into the memory. Hence, in terms of aircraft automatic flight control, a truly "universal" flight control system.

Patented April 6, 1971 3,573,442
5 Sheets-Sheet 1
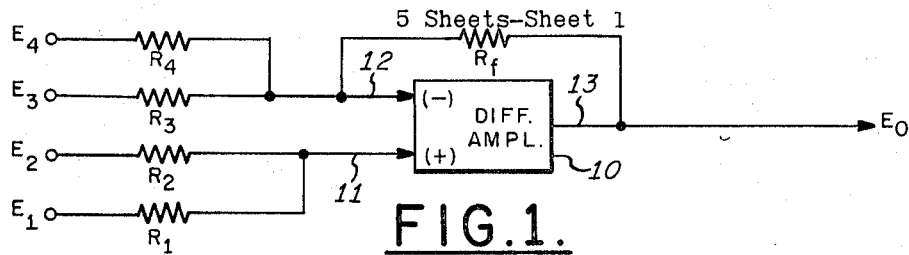
FIG.1.
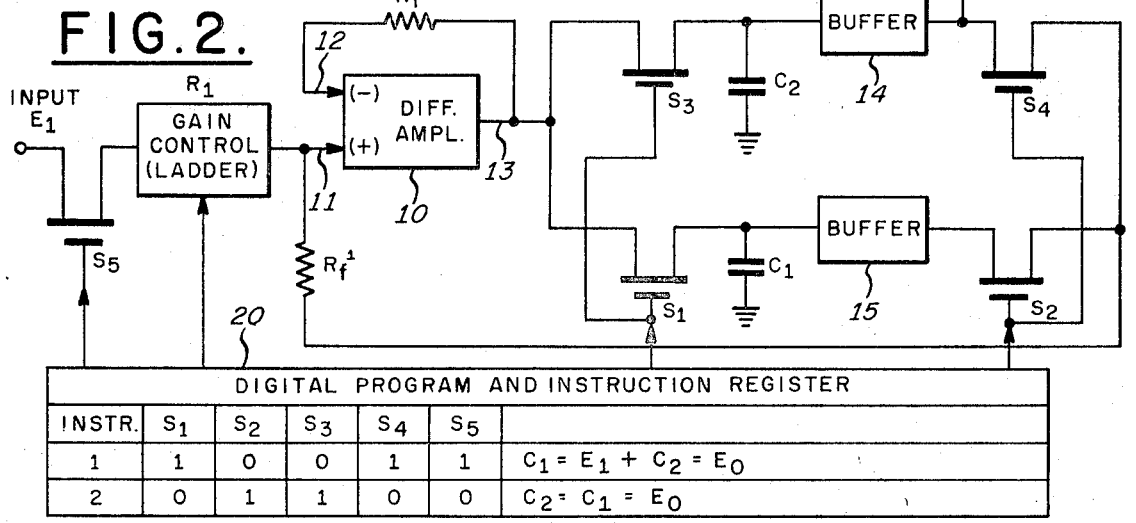
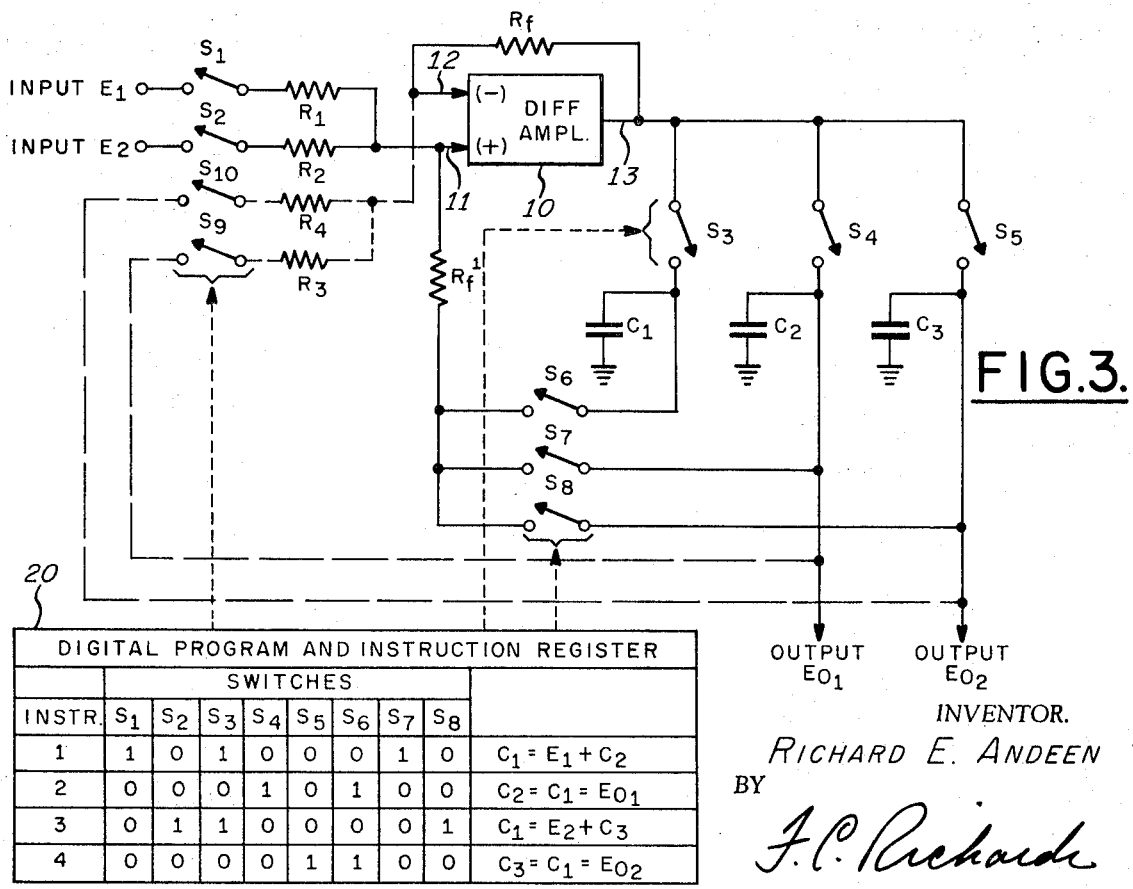
INVENTOR.
RICHARD E. ANDEEN
BY
J.C. Richards INVENTOR.
RICHARD E. ANDEEN
BY
*J.C. Richards*

Patented April 6, 1971
3,573,442
5 Sheets-Sheet 3
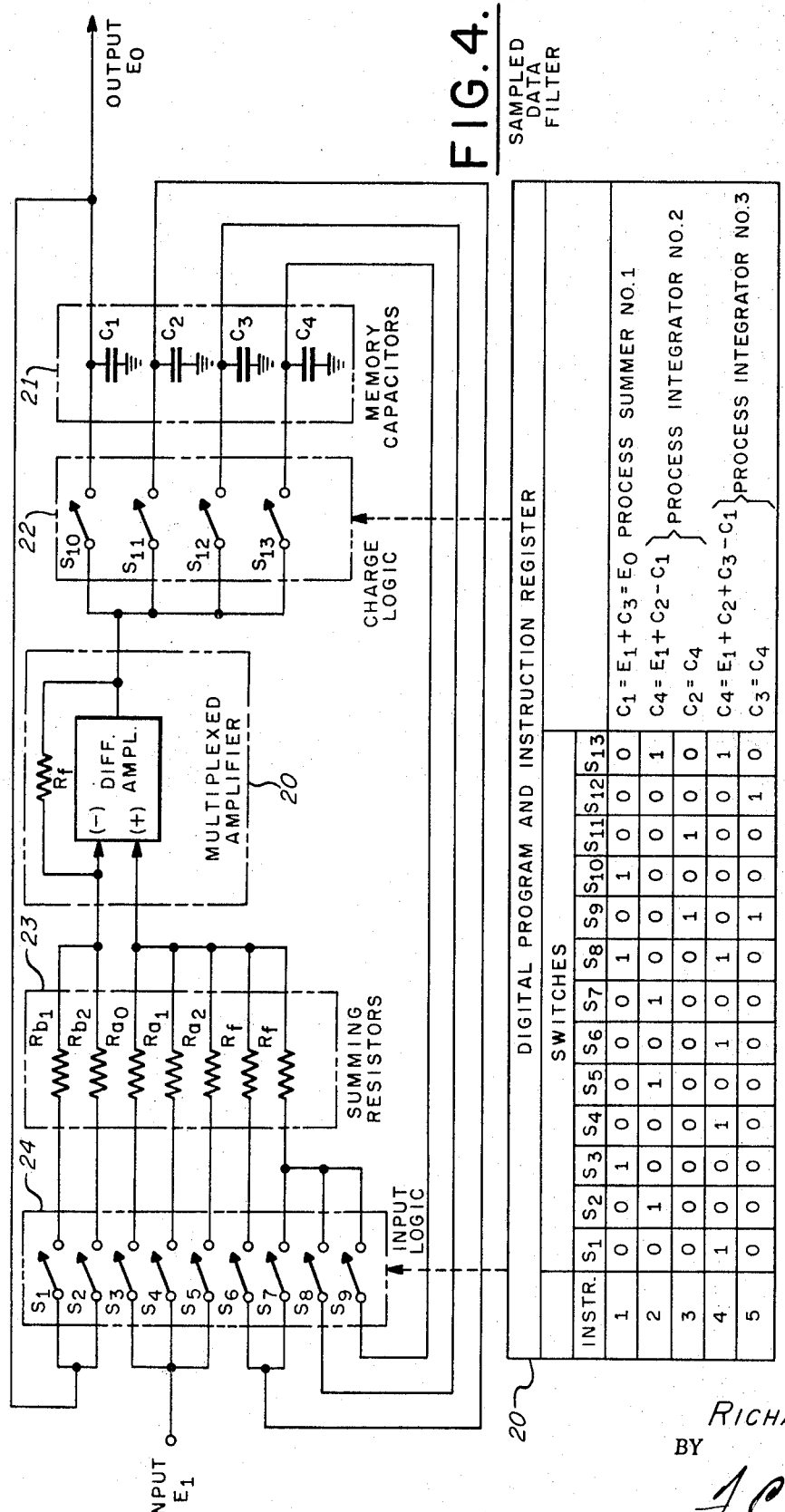
FIG.4. SAMPLED DATA FILTER
FIG.5. ANALOG EQUIVALENT OF FIG.4.
INVENTOR.
RICHARD E. ANDEEN
BY

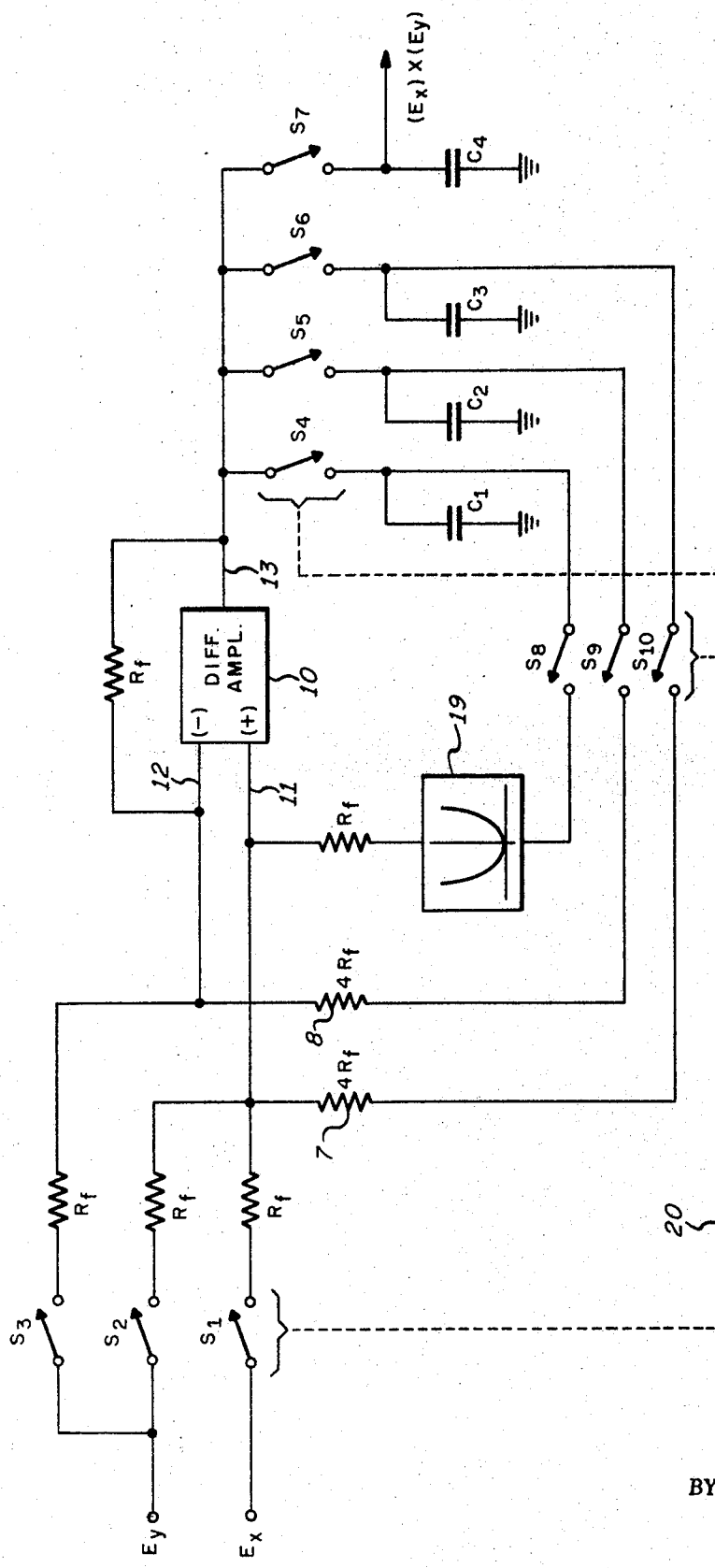

SAMPLED DATA HYBRID ANALOGUE-DIGITAL COMPUTER SYSTEM

SUMMARY OF THE INVENTION

The present invention relates generally to computers of the sampled data type and more particularly to sampled data computers for use in controlling complex servomechanisms, such as for example, aircraft automatic pilots. In such systems, data in the form of analog electrical signals supplied from a plurality of signal sources, such as displacement and rate gyroscopic sensors, accelerometers and various path control signal sources are selected, operated upon in accordance with particular mathematical functions and combined in particular manners, to provide output signals to servoactuators for operating the aircraft control surfaces (and/or to display devices of instrument systems). The present invention concerns a computer of the sampled data type for performing the selecting, computing and combining functions above-noted and comprises a single time shared or multiplexed operational amplifier adapted to add and subtract analog signal quantities through a plurality of input switches and to store the results through a plurality of output switches on memory devices, such as capacitors, which results are called out at the proper times as analog outputs and/or feedback signals. By proper sequencing of switch operations, any linear filtering function can be performed. Certain nonlinear functions such as limiting may be similarly performed. The sequence of switch operations is determined by the contents of a digital program memory. Such a system has a number of advantages over a completely analog or a completely digital mechanization. For example, changes in computation are made by memory programming rather than by hardware modifications; no complex analog-to-digital or digital-to-analog conversions are required, i.e., all data is processed, stored and called out in analog form thereby retaining the high degree of resolution of an analog system yet providing the high-speed capability of a digital system. Furthermore, since the computer of the present invention has fewer active parts than a pure digital computer of equivalent capability, it has both reliability and cost advantages.

The basic elements of the sampled data computer of the present invention comprise an operational amplifier which may be a high gain differential amplifier with both inverting and noninverting inputs (or alternatively separate inverting and noninverting amplifiers) and a feedback resistor connected from the amplifier output to the inverting input. The inputs to the amplifier are controlled in accordance with the conducting or nonconducting states of a plurality of input switches while the output thereof is applied to a plurality of analog signal storage devices, such as simple capacitors, in accordance with the conducting or nonconducting states of a plurality of output switches, the latter switches also controlling the output of the computer. The input switches constitute the read logic while the output switches constitute the store logic. The functions to be performed by the computer is determined by the proper sequence and combinations of switch operations which in turn is predetermined by the digital program memory.

The program memory may be perfectly conventional and preferably is of the nondestructive readout type (i.e., programmed for a particular type of vehicle) including, in addition to the usual interrogate and sense amplifiers, the logic required to cause the instructions to be read out in the sequence and also the logic to change the sequence as required by a particular flight control mode.

The principles of the present invention will be applied in performing various computations commonly required for automatic flight control purposes or for controlling similar complex servomechanisms; for example, summation, integration, complex filtering, limiting, multiplication, etc. The filter may be of the first, second or higher order types. A typical automatic flight control system embodying the principles of the present invention is disclosed.

BRIEF DESCRIPTION OF THE DRAWINGS

The principles involved in carrying out the present inventive concepts will be more apparent when considered in connection with illustrations of specific embodiments thereof set forth in the accompanying drawings wherein:

FIG. 1 is a block diagram of a basic summation circuit employing an operational differential amplifier;

FIG. 2 is a block diagram of the sampled data computer of the present invention programmed to perform an integration function;

FIG. 3 is a block diagram of the present sampled data integrator arranged to simultaneously integrate two independent signals; additional connections being shown for performing on said signals two independent first order of low-pass filter functions;

FIG. 4 is a block diagram of a general second order sampled data filter;

FIG. 5 is a block diagram of the purely analog equivalent of the general second order filter of FIG. 4 for comparison purposes;

FIG. 7 is a block diagram of a sampled data multiplier; and

DESCRIPTION OF THE PREFERRED EMBODIMENTS

Figure 8:
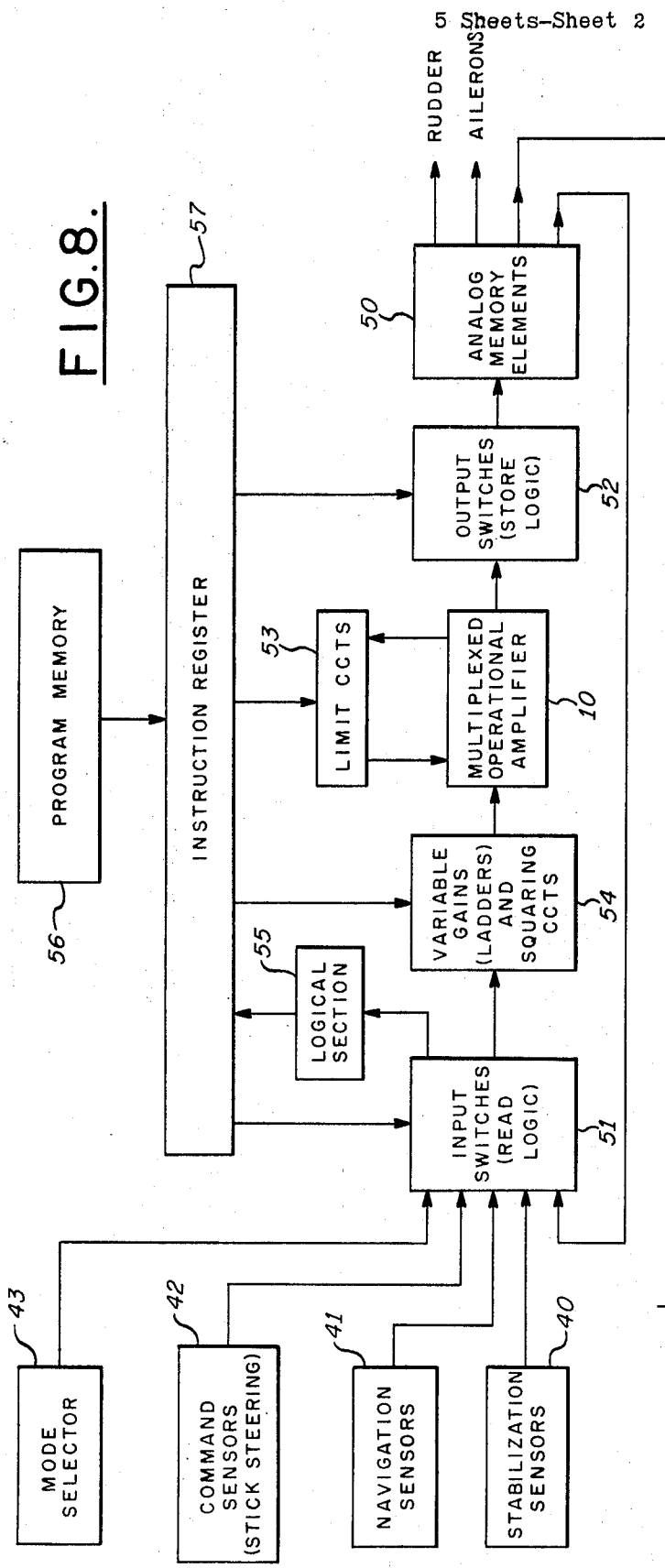
FIG. 8 is a generalized block diagram of a typical automatic flight control system embodying the sampled data computer principles of the present invention.

In the drawings many of the components are identified by numbered letters or combinations thereof, for example $C_1$, $R_5$, $R_{al}$, $S_2$, etc. However, throughout the following specification, these numerals and/or letters will be preceded by the numeral corresponding to the figure being discussed. Thus, for example, in the specification, the reference character $2S_4$ identifies switch $S_4$ of FIG. 2 of the drawings, reference characters $4C_3$ and $4R_{b1}$ in the specification represent capacitor $C_3$ and resistor $R_{b1}$ of FIG. 4 of the drawings, and so on. Numeric reference characters will also be used in a conventional manner.

Referring now to FIG. 1, the basic component of the sampled data computer of the present invention is a high gain differential amplifier indicated throughout the specification by reference character 10. It may be a conventional direct coupled differential amplifier having noninverting and inverting inputs 11 and 12 respectively and an output 13 although it will be understood that separate noninverting and inverting amplifiers may be employed. A feedback resistance $1R_f$ is connected from the output to the inverting input 12. Since signal summation is the basic required function of the present system, it has been shown separately in FIG. 1 and although conventional, it has been illustrated in the interest of completeness of the disclosure. Resistors $1R_1$ to $1R_4$ are interposed between the analog signal inputs $1E_1$ to $1E_4$ and the inputs 11 and 12 of amplifier 10. Thus with feedback resistor $1R_f$ connected, the output signal $1E_o$ on lead 13 is:

$$E_o = \left(\frac{R_f}{R_1}\right)E_1 + \left(\frac{R_f}{R_2}\right)E_2 - \left(\frac{R_f}{R_3}\right)E_3 - \left(\frac{R_f}{R_4}\right)E_4 \quad (1)$$

The proper gains for the input signals are provided by the selection of values for the resistors $1R_1$ to $1R_4$. Clearly, if any of the inputs are zero, their corresponding term in (1) will be zero. Thus, FIG. 1 discloses a means for summing, inverting and multiplying by proper gains a plurality of analog input signals.

The basic principles of the sampled data computer of the present invention are illustrated in FIG. 2 wherein the summation capabilities of the differential amplifier 10 of FIG. 1 is employed together with additional components to provide a sampled data integrator function. The additional components comprise a number of switches $2S_1$ to $2S_5$ and two analog storage devices, such as simple capacitors $2C_1$ and $2C_2$. Also provided is a conventional ladder network (represented here by $2R_1$) for controlling the gain of the analog input $2E_1$, a second amplifier feedback resistor $2R_f^1$, buffer amplifiers 14 and 15 and a digital programmer and instruction register 20 for operating the switches. The switches $2S_1$ to $2S_5$ may be transistor switches and are herein shown as field effect transistors. As stated above, the digital program memory determines the computation to be performed in FIG. 2, i.e., the integration function. The output of the program and instruction register 20 operates the switches $2S_1$ to $2S_5$ in a predetermined order at a fixed sampling rate and in a predetermined sequence. The sampling rate is high enough so that the output appears continuous for practical purposes, i.e., may be on the order of thousands of samples per second, but may be altered if required depending upon the desired gain and time constants of integration by program modification.

The word and bit program for integration is an illustrated within block 20. During one sampling interval, Instruction 1, the switch positions are 10011 (1 indicating a closed or conducting switch) and during the next interval, Instruction 2, they are 01100. The integral function is obtained as follows: Assuming no initial charge on either capacitor at the initiation of program Instruction 1, and a step input of 1 volt is applied at $2E_1$ through $2R_1$, to the noninverting input of amplifier 10, the voltage applied to $2R_f^1$ from $2C_2$ through $2S_4$ will be 0 volt, and the output of amplifier 10 will be 1 bolt (assuming $R_1=R_f$). Memory capacitor $2C_1$ will, therefore be charged to a value of 1 volt through closed switch $2S_1$, the output of $2E_0$ of the computer being zero since the charge on $2C_2$ is zero. During the next sampling interval, Instruction 2, the 1-volt charge on $2C_1$ will be applied to $2R_f$ through switch $2S_2$, to the noninverting input 11 of the amplifier 10 and, since $2S_5$ is now open, this 1 bolt will be applied to the memory capacitor $2C_2$ through $2S_3$ which will charge $2C_2$ to this voltage value, the computer output $2E_0$ being the same, 1 volt. During the next sampling interval, Instruction 1 again, the 1 volt on $2C_2$ is applied to $2R_f^1$ through $2S_4$ to be added to the input $2E_1$, being again closed, whereby the output of amplifier 10 is now 2 volts which charges $2C_1$ to this value through $2S_1$. The output $2E_0$ will remain at 1 volt. During the next sampling interval, Instruction 2 again, the 2 volts on $2C_1$ are applied to $2R_f^1$ through $2S_2$ and $2S_5$ being again open, the amplifier output will be 2 volts and $2C_2$ will be charged to this value so that the resultant charge on $2C_2$ will be 2 volts, which is the output value of $2E_0$. During the next sampling interval, Instruction 1, the 2 volts on $C_2$ are added to the input, the amplifier output being 3 volts which is applied to $2C_1$, charging it to this value. During the next interval, Instruction 2, the 3 volts on $C_1$ are applied to $C_2$ through amplifier 10 to charge it to this 3-volt value which is the value of the output $2E_0$. This sequence continues as long as the program calls for an integration of the input $2E_1$ with the output $2E_0$ increasing 1 volt every other instruction cycle. In practice, it is preferable to include word bits for providing a "space" between switch closings and openings to prevent any "cross talk" from occurring.

The integrator of FIG. 2 may be simplified by eliminating $2S_5$ and connecting the output $2E_0$ at the junction between $2S_2$ and $2S_4$. This results in an increase of 1 volt at the output $2E_0$ after each instruction rather than an increase of 1 volt after every other instruction cycle as in FIG. 2. However, the somewhat more complicated operation of the arrangement of FIG. 2, wherein capacitor $2C_1$ provides a temporary memory, will be justified when considering the multiplexing capabilities of the present invention as described below.

Figure 2A:
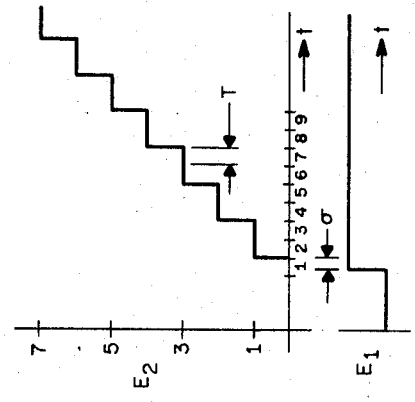
FIG. 2A is a graph of the output of the sampled data integrator of FIG. 2 in response to a step input.

The output of the sampled data integrator of FIG. 2 is illustrated in FIG. 2A and is a typical staircase function characterized by a sampling period $T$ and a delay $\sigma$ between the imposition of an input at $2E_1$ and an increase in the output $2E_0$. The sampling period $T$ is fixed at a value which depends at least upon the desired gain and time constants of the integrator while the delay depends upon the charge time of the capacitors $2C_1$ and $2C_2$ and also upon the switching logic. Since $\sigma$ cannot exceed $T$, the integration process may be expressed by the difference equation (referring to equation (1)):

$$E_o(n) = \frac{R_f}{R_f^1}\left(E_o(n-1) + \frac{R_f}{R_1}E_1(n)\right) \quad (2)$$

where $E_1(n)$ is the value of $E_1$ during the $n$th sampling period. Equation (2) may be expressed in terms of the $(z)$ transform variable as follows:

$$\frac{E_o(z)}{E_1(z)} = \frac{\frac{R_f^2}{R_1 R_f^1}}{1 - \frac{R_f}{R_f^1}z^{-1}} = \frac{K_I}{1 - e^{-T/\tau}z^{-1}} \quad (3)$$

which is the conventional transfer function of a continuous integrator followed by a zero order hold having an integrator gain constant $K_I$ and integrator time constant $\tau$. If we assume $K_I$ is equal to the reciprocal of $T$ which is the sampling rate of the computer system, and also assume $R_f=R_f^1=R_1$, then we have the transfer function of a perfect integrator given below:

$$\frac{E_o(z)}{E_1(z)} = \frac{1}{1-z^{-1}} \quad (4)$$

In practice $R_f$ and $R_f^1$ are never exactly equal which results in an imperfect integrator having a time constant given approximately by:

$$\tau = \frac{50T}{\Delta} \quad (5)$$

where $$R_f = R(1 - \Delta/100)$$

and $$R_f^1 = R(1 + \Delta/100)$$

For typical values of $T$ equal to 0.01 second and $\Delta$ equal to 0.1 we have an integrator time constant $\tau$ equal to 5 seconds which is acceptable for most practical appreciations. For longer time constants either the sampling period of the computer system must be increased, or the tolerances on the impedences $R_f$ and $R_f^1$ be controlled more closely, or a combination of both.

It will be noted that the integrator of FIG. 2 differs substantially from a conventional analog integrator which must have a very large capacitor connected in feedback around a high-gain amplifier, the figure of merit of such an integrator being a function of the holding capacity of the feedback capacitor. Furthermore, in a complex system, such as an aircraft autopilot, for example, a large number of individual integrators are required, adding to system complexity and cost. Also, the sampled data integrator of the present invention differs from a conventional digital integrator in that no analog-to-digital and digital-to-analog conversion is required. Also, a purely digital integrator processes each signal individually by sequential arithmetic operations. It is thus more complex and signal resolution lost due to the required conversions.

The sampled data integrator of the present invention requires but quite small capacitors, for example, 0.01 μf., since the size affects only the charge and discharge time constants and not the integrator gain or time constants. Furthermore, as will become evident below, only one amplifier is required for the complete computing system since its operation may be readily multiplexed. But more important, it does not require data conversion or quantization and hence retains the resolution of a purely analog system.

The above-described sampled data computation technique lends itself readily to multiplexed operation for performing a plurality of computations at the same time and also for performing more complex computations. This is accomplished by expanding the circuit of FIG. 2 to include a number of memory capacitors and consequent larger number of charging switches and sampling switches. While the programmer for the arrangement of FIG. 2 may constitute a relatively simple microcircuit logic, the more complex computer system may require that the sequential program be retained in a digital memory which may be of any conventional type, such as a core matrix or drum.

Referring now to FIG. 3, a more complex sampled data computer is illustrated. In this arrangement two integrators are multiplexed to provide separate integration of two independent input quantities. Here the differential amplifier 10 receives inputs $3E_1$ and $3E_2$ at its noninverting input 11 through input switches $3S_1$ and $3S_2$ and gain controlling resistances $3R_1$ and $3R_2$, respectively. The amplifier output 13 is coupled to memory capacitors $3C_1$, $3C_2$ and $3C_3$ through charging switches $3S_3$, $3S_4$ and $3S_5$, respectively. The outputs $3E_{01}$ and $3E_{02}$ are taken from $3C_2$ and $3C_3$ and are also applied to $3R_f^1$ together with the output of the time shared capacitor $3C_1$ through $3S_7$, $3S_8$ and $3S_6$, respectively. The digital program and instruction register 20 controls the sequence of switch operation for this computer arrangement and the program is set forth within the block. The separate integration of two independent input signals is accomplished by four instruction words of eight bits each contained within the program memory. The operation of the dual integrator of FIG. 3 is similar to that of the single integrator of FIG. 2. The gain constant of each integrator is dependent upon the switching or sampling frequency and the value of $3R_1$ and $R_2$ which values, as in the case of FIG. 2, may be predetermined by an additional program output controlling a transistor switched ladder network.

FIG. 3, may be easily modified to provide a further computational capability of the sampled data system of the present invention; i.e., to synthesize separate first order or low-pass filters. This may be accomplished by simply connecting the outputs $3E_{01}$ and $3E_{02}$ of the integrators back to the inverting input 12 of differential amplifier 10 through two additional input switches and corresponding input resistors as shown by the dashed lines in this FIG. These feedback connections provide the capability of synthesizing separate first order or low pass filtering of each of the inputs $3E_1$ and $3E_2$, the time constants being determined by the values selected for the resistors connected to the inverting input. The digital programmer 20 will, therefore, include two additional word bits for the additional switches, both being actuated preferably simultaneously with $3S_1$ and $3S_2$, respectively.

The expansion of the sampled data computer of FIGS. 2 and 3 to perform even more complex computations is illustrated in FIG. 4. This FIG. shows a sampled data computer for synthesizing the general second order filter function:

$$\frac{E_0(s)}{E_1(s)} = \frac{a_0 s^2 + a_1 s + a_2}{s^2 + b_1 s + b_2} \quad (6)$$

The overall configuration is similar to those of FIGS. 2 and 3 and comprises the multiplexed differential amplifier 10, a bank of memory capacitors 21 with their charging switch logic 22, a bank of summing resistors 23, one or more of which may comprise programmed ladder networks, and an input switch logic 24, the switch logics (and ladder networks, if desired) being controlled from the digital program and instruction register 20. The program 20 controls the operation of the switch logic in accordance with five instruction words of 13 bits each as set forth within the program block 20. In general, memory capacitor $4C_1$ holds the filter output, capacitors $4C_2$ and $4C_3$ are the integrator outputs while capacitor $4C_4$ constitutes a temporary storage shared by the two integrators as in the arrangement of FIG. 3. While the use of the time shared capacitor results in considerable savings in system complexity, it will be understood that two capacitors for each integrator may be used as indicated in connection with the discussions of FIG. 2.

As an aid to understanding the operation of the sampled data second order filter of FIG. 4, the continuous analog equivalent of a typical second order filter is illustrated in FIG. 5. It will be noted that the feed forward impedances $5a_0$, $5a_1$, $5a_2$ and the feedback impedances $5b_1$, $5b_2$ of the second order filter of FIG. 5 find their corresponding counterparts in $4R_{a0}$, $4R_{a1}$, $4R_{a2}$ and $4R_{b1}$, $4R_{b2}$ in the summing resistor bank 23 of FIG. 4. Also, the process summing amplifier No. 1 and process integrators No. 2 and No. 3 of FIG. 5 correspond to the similarly numbered instruction steps of the digital program 20 of FIG. 4.

Higher order filter functions may be formed in the same manner as the second order filter function of FIG. 4 by correspondingly increasing the number of process integrators and their corresponding feedforward and feedback circuits. Thus, the number of storage capacitors, charging switches and input switches is dependent upon the order of the filter it is desired to synthesize.

In controlling most complex servomechanisms, it is often required to perform a number of nonlinear computations. The sampled data computer of the present invention is also arranged to synthesize this type of function, e.g., limiting and multiplication. The arrangement shown in FIG. 6 provides normal limiting.

It is desired that the sampled data computer be programmed to provide limiting of a selected input voltage to any desired value, i.e., a variable limit, and yet accomplish this with a minimum of additional components. The arrangement shown in FIG. 6 is programmed to accomplish this by using a single fixed voltage limiter and to program the gain of the input signal depending upon the desired limiting value. Specifically, the input signal $6E$ to be limited is applied to ladder network 30 where the desired impedance $$R = \frac{R_f}{K_s},$$

corresponding to the desired limit value, is selected by digital programmer 20 through ladder switches $6S_6$ to $6S_N$, this signal being applied to the noninverting input 11 of differential amplifier 10. It should be noted that a typical ladder network is shown in FIG. 6 and may be of the thin film type having shorts controlled by transistor switches controlled in turn from the digital program 20. This is typical of the ladder networks referred to in connection with the other FIGS. The output of amplifier 10 is fed back to the inverting input 12 through switch $6S_2$ and zener diodes 32 in parallel with $R_f$. With this limiter, two program instructions are required. The first calls for the closing of switches $6S_1$, $6S_2$ and $6S_3$ and the opening of switches $6S_4$ and $6S_5$ which provides a fixed limit on the amplifier output and for the charging of $6C_1$, also for the selection of the desired impedance from ladder 30 through switches $6S_6$ to $6S_N$ corresponding to the desired limit value, i.e., ($R=R_f/K_s$). The second instruction calls for the opening of switches $6S_1$, $6S_2$ and $6S_3$ and the closing of switches $6S_4$ and $6S_5$ which applies the voltage on $C_1$ back to the ladder 30 and removes the fixed limit on the amplifier output, and also for the selection of the desired impedance from ladder 30 through switches $6S_6$ to $6S_N$ corresponding to the desired limit value, i.e., ($R=K_s R_f$). ($K_s$ is the ratio of fixed limit $1_c$ to the desired limit $1_p$, i.e., $K_s = 1c/1p$.) In effect, during the first instruction time the signal at amplifier output 13 is $E_{x_1} = \lim [K_s E_x]$ and during the second instruction time the desired output $6E_{x_1}$ is $E_{x_1} = 1/K_s E_{x_1}$. If it is desired to limit the input to a different value $1_p$, then the value of $K_s$ in the expression is adjusted appropriately, this determining the switching program for switches $6S_6$ to $6S_N$. In the limiter arrangement of FIG. 6, any suitable voltage limiter device may be used, the Zener diodes illustrated being preferable since they require no operating power as would back-biased diodes.

Figure 6:
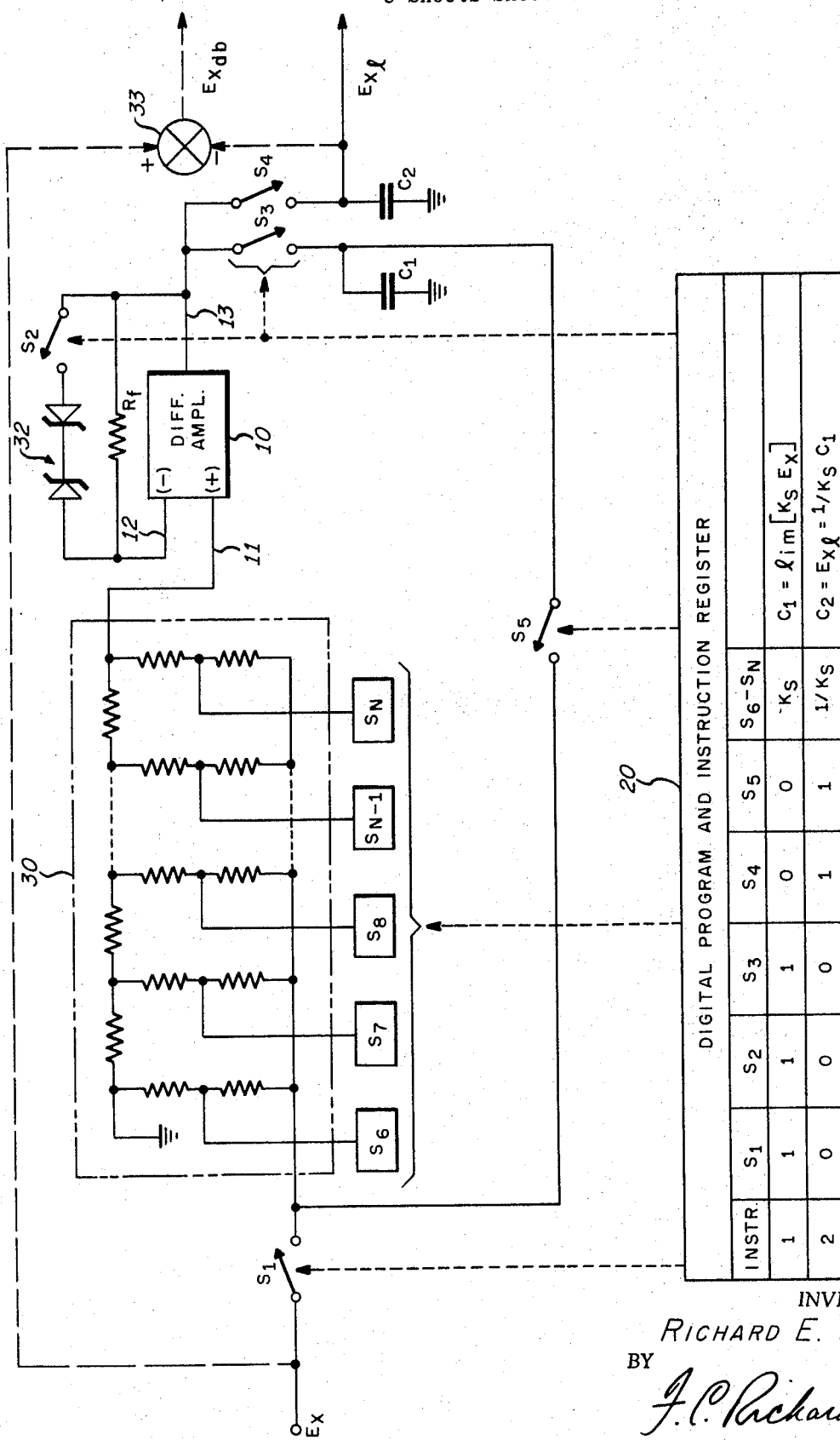
FIG. 6 is a block diagram of a typical sampled data limiter.

The limiter arrangement of FIG. 6 may be modified as shown by dashed lines to provide a deadband function. For this case, the output of the limiter $6E_{x_1}$ is subtracted, as at summing point 33, from the original input signal $6E_x$ to provide the desired deadband function $E_{x_{db}} = E - E_{x_1}$. The instructions contained in the program are the same.

In many servomechanisms, a multiplier is required for gain changing or for function generation. The quarter square technique is well suited to high speed and moderate accuracy requirements. How this is provided by the sampled data computer of the present invention is illustrated by the arrangement shown in FIG. 7. Specifically, the input signals to be multiplied $7E_x$ and $7E_y$ are applied to switches $7S_1$, $7S_2$ and $7S_3$ which are selectively closed or opened in accordance with the digital program 20. Five program steps are required to obtain the product $(E_x) \times (E_y)$. In the first instruction switches $7S_1$, $7S_2$ and $7S_4$ are closed and the sum $E_x+E_y$ is formed and stored as a voltage on $7C_1$. In step 2 the voltage on $7C_1$ is applied to a squaring circuit 19, which may consist of a conventional diode on transistor function generator circuit or other suitable square law device and the result is applied through switch $7S_5$ to $7C_2$. In instruction 3 the difference $E_x-E_y$ is formed by closing switches $7S_1$ and $7S_3$ and the result is stored as a voltage on $7C_1$ through switch $7S_4$. In instruction 4 the voltage on $7C_1$ is applied to the squaring circuit 19 and the result is applied through switch $7S_6$ to $7C_3$. In the final instruction, 5, the voltages on $7C_2$ and $7C_3$ are applied through switches $7S_9$ and $7S_{10}$ to the inverting input 12 and noninverting input 13 of the differential amplifier 10. The input resistors 7 and 8 have impedances of $4R_f$ which provides a gain $R_f/4R_f$ equals ¼. The result is given by $$7C_4 = \frac{1}{4}[C_3 - C_2] = (E_x) \times (E_y) \qquad (7)$$

The sampled data computer of the present invention is expanded into a complete programmed computer for automatic flight control applications, a block diagram of which is illustrated in FIG. 8. It includes the integration, complex filtering, limiting and multiplication functions set forth in the previous FIGS. as well as logical functions required by mode switching together with a means for programming the gains of the various system control signals.

A conventional automatic flight control system includes (for each axis of control) stabilization sensors 40 which usually comprise displacement and rate sensors, such as displacement and rate gyroscopes and/or accelerometers; navigation sensors 41 which usually comprise compass systems, radio receivers such as VOR–ILS, Tacan, Doppler etc. receivers for flight path definition or complete inertial navigators; command sensors 42 such as, for example, control stick or control wheel steering sensors for manual maneuvering; and a mode selector 43 for selecting the desired mode of operation of the flight control system. The aircraft control surface 44 is moved in accordance with the output of the system through hydraulic or electric servoactuator 45 and servoamplifier 46, buffer circuits 47 being provided for coupling the output signals of the sampled data computer memory elements to the servoamplifier 46. All of the foregoing elements may be conventional and are well known in the flight control art.

In conventional flight control systems, the various sensor signals are separately processed and summed to provide an output command to the servoactuators. This involves separate and complex circuitry and often considerable circuit redundancy. In accordance with the teachings of the present invention, the signal processing and summation is accomplished by means of the programmed sampled data technique described in the foregoing. Thus, the basic components of the sampled data computer of FIG. 8 are, as in the above-described embodiments, the multiplexed operational amplifier 10, analog memory elements 50, input switches 51 constituting the read logic, limiting (and deadband) circuits 53, and variable gain ladders 54 for programming the system gains and which also include squaring circuits for multiplication. A logical section 55 is provided for determining which control modes are to be effected at a given time. All of the foregoing elements are controlled from the digital program memory 56 and instruction register 57.

The memory 56 and instruction register 57 may be of any conventional type. The memory 56 preferably has a nondestructive readout and is nonvolatile. The number of instruction words and word bits are dependent upon the number of signals to be processed and the process functions to be performed. The instruction register may be the conventional chain of flip-flops set by the memory word bits which in turn operate the read and store logic switches 51 and 52 respectively, the variable gains 54 and limiter circuits 53. While the logical operations required of the flight control system may be performed by the sampled data computer itself, for example, as by using coded inputs or a programmable logic section at the amplifier input and a comparator responsive to the output of the amplifier 10 for controlling the register 57, a separate logical section 55 is preferred since its operation is capable of higher rates than the signal processing operation and hence the logical operations need not take up time needed for the signal processing functions.

Automatic flight control systems vary in complexity in accordance with the aircraft control functions to be be automated and the type of airframe to be controlled. For example, they vary from a simple single or multiple axis stability augmentation system to complex systems for controlling the aircraft flight path in accordance with internally generated navigation information (inertial navigation systems), external navigation information such as defined by radio beams (VOR, ILS, etc.), military fire control information, etc. In accordance with the teachings of the present invention, the flight control system requirements are predetermined which in turn determines the number of input and output switches and analog memory elements necessary to perform the computations and signal processing necessary to fulfill these requirements. The order in which these functions are performed is also predetermined and is controlled by the program memory. In practice, the requirements of a generalized flight control system are determined and a computer including the required memory and switching elements is constructed while the requirements of the application thereof to a specific installation (e.g., aircraft type and mission) may be met by a specific program corresponding to these specific requirements.

For example, consider a three axis stability augmentation system. The basic system comprises roll, pitch, and yaw rate gyros, signal processing computer and servoamplifiers and actuators. The sampled data computer performs the signal processing required, which processing includes second order filtering of the gyro signals, limiting these signals to a desired level and selecting the proper signal gains. Thus, sampled data computer systems will include the second order filter arrangement of FIG. 4 and the limiter of FIG. 6. The input logic 51 must have the capacity to select from a minimum of 16 signals, three for each gyro 40, four for the second order filter feedbacks, and three for the limiting function. Two five bit ladder gain changers 54 are provided, one for selecting the desired gain level of the sampled gyro signals and the other for selecting the desired limit for the sampled gyro signals. The output of operational amplifier 10 will be applied to 12 memory capacitors 50, four for each of the three control axes, through a corresponding 12 output logic switches 52. The foregoing establishes a memory word length of about 40 bits. The number of memory words is also determined from the foregoing; 15 for the filter function, six for the limiting function and others for the required summing operations, a total of about 25 words.

For implementing a complete flight control system, additional switching is provided for selecting signals from navigation sensors 41, command sensors 42, and mode selector 43, the latter establishing the inputs for logical section 55. Additional gain change ladders are provided for parameter control purposes as well as for establishing the limits to be imposed on the signals. Also, in connection with automatic path control, for example, integration is a requirement so that the circuits of FIGS. 2 and/or 3 may be included in such complete autopilot. The program memory capacity will accordingly be increased to implement the more complex system, for example, it may be increased to 100 or more words of as many bits, a capacity presently available in biax or other solid state memory devices.

In a practical application of the present invention in a complete automatic pilot, a sampling rate of 100 times per second is reasonable and the number of computations or instructions to be performed per second is about 100. Thus, the computer clock frequency must be 10 kc., a frequency well within the capability of present day digital computers.

While the invention has been described in its preferred embodiments, it is to be understood that the words which have been used are words of description rather than of limitation and that changes within the purview of the appended claims may be made without departing from the true scope and spirit of the invention in its broader aspects.

I claim:

1. A sampled data computer for performing predetermined computation on analog information signals comprising:
    a. a high gain differential amplifier means having noninverting and inverting inputs and an output and an impedance means coupling said output to said inverting input for adding and subtracting signals applied to said amplifier inputs;
    b. means supplying analog information signals to at least one of said amplifier inputs;
    c. a plurality of analog signal storage means responsive to the output of said amplifier;
    d. a plurality of switch means having conducting and nonconducting states for connecting said amplifier output to said signal storage means and for connecting said storage means back to said amplifier inputs for combining the signals stored therein with said information signals;
    e. digital memory means connected to control said plurality of switch means in accordance with a predetermined program, said program comprising a plurality of sequential word instructions, each word comprising a plurality of bits corresponding to said plurality of switches for controlling the states of said switches, said program determining the computation to be performed on said analogue information signal; and
    f. an output means coupled with at least one of said signal storage means and responsive to the resultant signal stored thereon.

2. The sampled data computer as set forth in claim 1 wherein said analog storage means comprises capacitor devices.

3. The sampled data computer as set forth in claim 1 wherein said switching devices comprise electronic switches of the transistor type.

4. The sampled data computer as set forth in claim 1 for computing the integral of said information signal wherein:
    a. said information signal is applied to said noninverting input of said amplifier;
    b. said signal storage means comprises at least first and second signal storage devices;
    c. said plurality of switches comprises at least first and second switches for selectively connecting said amplifier output to said first and second storage devices respectively and third and fourth switches for selectively connecting the signal stored on said first and second storage devices respectively back to the noninverting input of said amplifier;
    d. said digital memory supplied at least two sequential instruction words repeated over a time period each comprising at least four bits, the first instruction word bits being such that said first and fourth switches are closed and said second and third switches are open whereby to apply the signal stored on said second storage device to said amplifier input and to apply said amplifier output to said first signal storage device, and the second instruction word bits being such that second and third switches are closed and said first and fourth switches are open whereby to apply the signal stored on said first storage device to said amplifier input and to apply said amplifier output to said second signal storage device, and so on; and wherein
    e. said output means is coupled with said second signal storage device.

5. The sampled data computer as set forth in claim 4 further including: additional switch means and additional digital word and word bits for connecting the output signal stored on said second signal storage means to the inverting input of said amplifier for opposing said information signal whereby to provide a low pass filtering function of said analog information signal.

6. The sampled data computer as set forth in claim 1 for limiting the value of said information signal to any desired value wherein:
    a. said differential amplifier output to said inverting input coupling means includes means for limiting the magnitude of said amplifier output to a predetermined fixed value and limiter switch means having conducting and nonconducting states for rending said limiting means effective and noneffective; and further including;
    b. variable impedance means coupling said information signal to the noninverting input of said amplifier and including switch means for determining the impedance to said signal whereby to determine the gain thereof; and
    c. said signal storage means includes at least first and second storage means; and wherein
    d. said programmed digital memory includes a first instruction word for controlling said switch means such as to select the gain of said information signal, limit the same to said predetermined value and supply said limited signal to said first signal storage means, and a second instruction word for controlling said switch means such as to render said limiting means noneffective, supply said stored signal to said variable impedance means whereby to vary the value thereof in accordance with said reciprocal impedance value, and for storing the resulted signal in said second storage means.

7. The sampled data limiter as set forth in claim 6 further including means responsive to said information signal and the output of said second signal storage means for supplying an output in accordance with the difference therebetween whereby to provide a deadband function.

8. The sampled data computer as set forth in claim 1 for computing the product of two analog input signals wherein:
    a. said means supplying analog information signals includes switching means for supplying two information signals to said noninverting amplifier input and one of said information signals to said inverting amplifier input; wherein
    b. said signal storage means includes at least four signal storage means; further including
    c. a squaring circuit including switching means for coupling the output of one of said storage means to the noninverting input of said amplifier; and further including
    d. impedance means including switching means for coupling a predetermined portion of the signals stored on second and third of said storage means to said noninverting input; and wherein
    e. said programmed digital memory includes a group of instruction words for controlling said switch means such as to store signals proportional to the squares of the sum and difference of said input signals on said second and third storage means, respectively, and a further instruction word for controlling said switching means such as to supply the signals stored on said second and third storage means to said impedance means and the output of said amplifier to the fourth of said storage means, whereby the signal stored thereon is proportioned to the product of said input signals.

9. The sampled data multiplier as set forth in claim 8 wherein said group of instruction words comprises a first instruction word for controlling said switching means such as to store on said one storage means the sum of said input signals, a second instruction word for controlling said switching such as to couple the signal stored in said one storage means to said squaring circuit and to store the output of said amplifier on second of said storage means, a third instruction word for controlling said switching means such as to store on said one storage means the difference of said input signals, and a fourth instruction word for controlling said switch such as to couple the signal stored on said one storage means to said squaring circuit and to store the output of said amplifier on said third storage means.

10. A sampled data computer system for performing a plurality of computations on a plurality of analog input signals and for supplying analog output signals proportional to predetermined functions of said input signals, said system comprising:
   a. a multiplexed high gain differential amplifier means having inverting and noninverting inputs and an output and including a feedback impedance connecting said output to said inverting input whereby to add and subtract signal quantities applied thereto;
   b. a plurality of analog signal storage means;
   c. a plurality of output switching devices having conducting and nonconducting states for selectively connecting said amplifier output to corresponding ones of said signal storage means depending upon the states thereof whereby to store said amplifier output in said selected storage means;
   d. a plurality of input switching devices having conducting and nonconducting states for selectively connecting a plurality of signals to said amplifier inputs depending upon the states thereof, said plurality of signals including said analog input signals and selected ones of the signals stored on said storage means;
   e. a programmed digital memory means for determining the functions to be performed on said input signals, said digital memory providing sequentially read words, each word comprising a plurality of bits corresponding to said plurality of switch devices, whereby to control the sequence and order respectively of switch states required for performing said functions; and
   f. means coupled with selected ones of said signal storage means for supplying analog output signals corresponding to the resultant signals stored thereon.

11. The sampled data computer as set forth in claim 10 further including a plurality of impedances coupled between said input switches and said amplifier inputs for determining the gains of said selected signals.

12. The sampled data computer as set forth in claim 11 wherein at least one of said impedances comprises a resistance ladder network and a plurality of switches for selecting the resultant impedance thereof, and wherein said digital program memory includes word bits for controlling said ladder switches whereby to program the gains of said selected input signals in accordance with the function to be performed.

13. A digitally controlled, analog servomechanism comprising:
   a. a plurality of sensors for producing a plurality of analog signals each proportional to one of a plurality of conditions to be controlled;
   b. servomotor means for controlling said conditions;
   c. sampled data computer means responsive to said sensor signals for performing a plurality of predetermined computations thereon and for supplying resultant output signals to said servomotor means whereby to control said conditions in accordance with said predetermined computations, said computer means comprising:
     1. a multiplexed high gain operational amplifier means having inverting and noninverting inputs and an output and including impedance means coupled between said output and said inverting input whereby to add and subtract signal quantities applied thereto;
     2. a plurality of analog signal storage means and a store logic for connecting the output of said amplifier means to selected ones of said storage means;
     3. a read logic for connecting selected ones of said analog sensor signals to said amplifier inputs, said read logic also connecting selected ones of said storage means to said amplifier inputs whereby to provide selective feedback connections for said amplifier means; and
     4. a digital memory means for controlling said read and store logics, said memory including a digital program comprising a plurality of sequentially read words for determining the computations to be performed on said signals, each word comprising word bits for determining the operation of of said read and store logic corresponding to the computations to be performed; and
   d. means coupled with selected ones of said storage means for supplying the analog signals stored thereon to said servomotor means.

14. A sampled data computer for computing a general plural order filter function of an analog information signal comprising:
   a. a multiplexed high gain differential amplifier means having noninverting and inverting inputs, an output and a feedback impedance connected from said output to said inverting input for adding and subtracting analog signals applied to said inputs;
   b. a plurality of analog signal storage devices related in number to the order of the filter function to be performed, the signal stored on one of said storage devices constituting the output of said computer;
   c. a plurality of charge switches corresponding in number to the number of said storage means for coupling said amplifier output thereto;
   d. a plurality of input switches related in number to the order of the filter function to be performed for coupling signals applied thereto to said amplifier inputs and an impedance means associated with each switch for establishing the gain of the signals applied thereto;
   e. means supplying said information signal to a first group of said input switches for connecting said information signal to said noninverting amplifier input, means supplying the signal stored on said one storage device to a second group of said input switches for connecting said stored signal to the inverting amplifier input, and means supplying the signals stored in said other signal storage devices to a third group of said input switches for connecting said other stored signals to said noninverting amplifier input; and
   f. a programmed digital memory means for controlling said input and charge switches, said memory including a plurality of sequentially read digital words, each word including a plurality of word bits related in number to said plurality of switches and determining the state of said switches, said word sequence determining the sequential operations required for performing said filter function.

15. A sampled data computer for performing predetermined computations on analog information signals comprising:
   amplifier means having input means and an output;
   said input means being responsive to said analog information signals;
   a plurality of analog signal storage means responsive to said amplifier output;
   a plurality of switch means having conducting and nonconducting states for coupling said amplifier output to said signal storage means and for coupling said storage means back to said amplifier input means for combining the signals stored therein with said information signals;
   digital memory means connected to control said plurality of switch means in accordance with a predetermined program, said program comprising a plurality of sequential word instructions, each word comprising a plurality of bits corresponding to said plurality of switches for controlling the states of said switches, said program determining the computation to be performed on said analog information signal; and
   an output means coupled with at least one of said signal storage means and responsive to the resultant signal stored therein.

16. The sampled data computer as set forth in claim 15 wherein said plurality of switch means comprises:
   a plurality of output switch means having conducting and nonconducting states for selectively coupling said amplifier output to selected ones of said signal storage means; and a plurality of feedback switch means having conducting and nonconducting states for selectively coupling said signal storage means back to said amplifier input means for combining the signals stored therein with said information signals.